US010003671B2

(12) United States Patent
    Damale (10) Patent No.: US 10,003,671 B2
(45) Date of Patent: *Jun. 19, 2018

(54) CAPTURING AND REPLAYING APPLICATION SESSIONS USING RESOURCE FILES

(71) Applicant: International Business Machines Corporation, Armonk, NY (US)

(72) Inventor: Shridhar Damale, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/459,086

(22) Filed: Mar. 15, 2017

(65) Prior Publication Data

US 2017/0187842 A1    Jun. 29, 2017

Related U.S. Application Data

(63) Continuation of application No. 13/834,963, filed on Mar. 15, 2013, now Pat. No. 9,635,094.
(Continued)

(51) Int. Cl.
    *H04L 29/08*    (2006.01)
(52) U.S. Cl.
    CPC .............. *H04L 67/36* (2013.01); *H04L 67/02* (2013.01); *H04L 67/22* (2013.01)
(58) Field of Classification Search
    CPC ................................ H04L 67/22; H04L 67/36
    See application file for complete search history.

(56) References Cited

U.S. PATENT DOCUMENTS

| 5,463,547 A | 10/1995 | Markowitz |
| 5,564,043 A | 10/1996 | Siefert |
| (Continued) | | |

FOREIGN PATENT DOCUMENTS

| CA | 2656539 | 2/2008 |
| CA | 2696884 | 3/2009 |
| (Continued) | | |

OTHER PUBLICATIONS

Smith et al., "Automated Protocol Analysis," Human Computer Interaction, 8:101-145, 1991.
(Continued)

*Primary Examiner* — Scott Baderman
*Assistant Examiner* — Mario M Velez-Lopez
(74) *Attorney, Agent, or Firm* — Rahan Uddin; Edell, Shapiro & Finnan, LLC (57) ABSTRACT

A capture and replay system identifies images displayed during an application session. A parser may generate Hypertext Markup Language (HTML) code from an application resource file or from the JSON post made by the application. A replay engine may use the HTML code to recreate at least some of the screens displayed during the application session. The capture and replay system may dynamically identify images that are not reproduced from the resources database and request an agent/(s) to asynchronously upload the image files associated with the images. The replay engine may use the uploaded image files to replay the application session. The capture and replay system may capture application sessions more efficiently by reproducing images from the resource file instead of capturing the images during the original application session and by dynamically requesting image files for the images were are not previously reproduced from the resource file. Once an image file is uploaded
(Continued)

US 10,003,671 B2

Page 2 to server, it does not need to be requested again from any other agent.

14 Claims, 9 Drawing Sheets

Related U.S. Application Data (60) Provisional application No. 61/714,020, filed on Oct. 15, 2012.

(56) References Cited

U.S. PATENT DOCUMENTS

| | | |
|---|---|---|
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran et al. |
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem et al. |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papiemiak et al. |
| 6,151,601 A | 11/2000 | Papiemiak et al. |
| 6,169,997 B1 | 1/2001 | Papiemiak et al. |
| 6,182,097 B1 | 1/2001 | Hansen et al. |
| 6,253,203 B1 | 6/2001 | D'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papiemiak et al. |
| 6,334,110 B1 | 12/2001 | Walter et al. |
| 6,397,256 B1 | 5/2002 | Chan |
| 6,418,439 B1 | 7/2002 | Papiemiak et al. |
| 6,480,855 B1 | 11/2002 | Siefert |
| 6,489,980 B1 | 12/2002 | Scott et al. |
| 6,502,086 B2 | 12/2002 | Pratt |
| 6,502,096 B1 | 12/2002 | Siefert |
| 6,519,600 B1 | 2/2003 | Siefert |
| 6,589,980 B2 | 7/2003 | Miller et al. |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papiemiak et al. |
| 6,766,333 B1 | 7/2004 | Wu et al. |
| 6,850,975 B1 | 2/2005 | Daneels et al. |
| 6,877,007 B1 | 4/2005 | Hentzel et al. |
| 7,076,495 B2 | 7/2006 | Dutta et al. |
| 7,260,837 B2 | 8/2007 | Abraham et al. |
| 7,272,639 B1 | 9/2007 | Levergood |
| 7,278,105 B1 | 10/2007 | Kitts |
| 7,293,281 B1 | 11/2007 | Moran et al. |
| 7,415,517 B1 * | 8/2008 | Schleit .............. G06F 17/30 709/224 |
| 7,490,319 B2 | 2/2009 | Blackwell et al. |
| 7,580,996 B1 | 8/2009 | Allan |
| 7,627,648 B1 | 12/2009 | Mehta |
| RE41,903 E | 10/2010 | Wenig |
| 7,983,961 B1 | 7/2011 | Chang |
| 8,042,055 B2 | 10/2011 | Wenig |
| 8,127,000 B2 | 2/2012 | Wenig |
| 8,219,531 B2 | 7/2012 | Eagan |
| 8,225,376 B2 | 7/2012 | Zuckerberg |
| 8,266,673 B2 | 9/2012 | Hu |
| 8,335,848 B2 | 12/2012 | Wenig |
| 8,381,088 B2 | 2/2013 | Kikin-Gil et al. |
| 8,533,532 B2 | 9/2013 | Wenig |
| 8,583,772 B2 | 11/2013 | Wenig |
| 8,832,846 B2 | 9/2014 | Udani |
| 8,838,736 B2 | 9/2014 | Swahn |
| 9,635,094 B2 | 4/2017 | Damale |
| 2002/0049840 A1 | 4/2002 | Squire |
| 2002/0056091 A1 | 5/2002 | Bala |
| 2002/0065912 A1 | 5/2002 | Catchpole et al. |
| 2002/0070953 A1 | 6/2002 | Barg et al. |
| 2002/0083169 A1 | 6/2002 | Aki |
| 2002/0083183 A1 | 6/2002 | Pujare et al. |
| 2002/0112035 A1 | 8/2002 | Carey |
| 2002/0165954 A1 | 11/2002 | Eshghi et al. |
| 2003/0005000 A1 | 1/2003 | Landsman |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1 | 3/2004 | Benedikt et al. |
| 2004/0059997 A1 | 3/2004 | Allen et al. |
| 2004/0078464 A1 | 4/2004 | Rajan |
| 2004/0100507 A1 * | 5/2004 | Hayner .............. G06F 9/4443 715/855 |
| 2004/0158574 A1 | 8/2004 | Tom et al. |
| 2005/0021713 A1 * | 1/2005 | Dugan .............. H04M 3/42136 709/223 |
| 2005/0030966 A1 | 2/2005 | Cai et al. |
| 2005/0033803 A1 | 2/2005 | Vleet et al. |
| 2005/0066037 A1 * | 3/2005 | Song .............. G06F 17/30861 709/227 |
| 2005/0071464 A1 | 3/2005 | Kuwata et al. |
| 2005/0071760 A1 | 3/2005 | Jaeger |
| 2005/0086606 A1 | 4/2005 | Blennerhassett et al. |
| 2005/0188080 A1 | 8/2005 | Motsinger et al. |
| 2005/0198315 A1 | 9/2005 | Wesley |
| 2005/0216856 A1 | 9/2005 | Matti |
| 2005/0246651 A1 | 11/2005 | Krzanowski |
| 2005/0278565 A1 | 12/2005 | Frallura et al. |
| 2005/0289139 A1 * | 12/2005 | Takashima ....... G11B 20/00086 |
| 2006/0048153 A1 | 3/2006 | Truong |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2006/0162071 A1 | 7/2006 | Dixon et al. |
| 2006/0230105 A1 | 10/2006 | Shappir |
| 2006/0248452 A1 | 11/2006 | Lambert |
| 2007/0011321 A1 * | 1/2007 | Huntington .......... H04L 43/028 709/224 |
| 2007/0078866 A1 * | 4/2007 | Takashima .......... G06F 21/10 |
| 2007/0106692 A1 | 5/2007 | Klein |
| 2007/0174410 A1 | 7/2007 | Croft |
| 2007/0226314 A1 | 9/2007 | Eick |
| 2007/0245249 A1 | 10/2007 | Weisberg |
| 2007/0255754 A1 * | 11/2007 | Gheel .............. G06F 17/30867 |
| 2008/0005661 A1 | 1/2008 | Yao et al. |
| 2008/0005793 A1 | 1/2008 | Wenig |
| 2008/0034036 A1 | 2/2008 | Takeshima et al. |
| 2008/0046562 A1 | 2/2008 | Butler |
| 2008/0052377 A1 | 2/2008 | Light |
| 2008/0127217 A1 | 5/2008 | Wang |

(56) References Cited

U.S. PATENT DOCUMENTS

| | | |
|---|---|---|
| 2008/0209311 A1 | 5/2008 | Agronik |
| 2008/0162498 A1 | 7/2008 | Omoigui |
| 2008/0184129 A1 | 7/2008 | Cancel et al. |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0019354 A1* | 1/2009 | Jaiswal .............. G06F 17/3089 715/224 |
| 2009/0024930 A1 | 1/2009 | Kim |
| 2009/0037517 A1 | 2/2009 | Frei |
| 2009/0037914 A1 | 2/2009 | Chagoly et al. |
| 2009/0063968 A1* | 3/2009 | Wenig .................. G06Q 30/02 715/704 |
| 2009/0070869 A1 | 3/2009 | Fan et al. |
| 2009/0083714 A1 | 3/2009 | Kiciman et al. |
| 2009/0132957 A1 | 5/2009 | Reddy |
| 2009/0138554 A1 | 5/2009 | Longobardi et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0007603 A1 | 1/2010 | Kirkup |
| 2010/0042573 A1 | 2/2010 | Wenig |
| 2010/0058285 A1 | 3/2010 | Meijer et al. |
| 2010/0070929 A1 | 3/2010 | Behl et al. |
| 2010/0146380 A1 | 6/2010 | Rousso |
| 2010/0169792 A1 | 7/2010 | Ascar |
| 2010/0174774 A1 | 7/2010 | Kern |
| 2010/0211638 A1 | 8/2010 | Rougier |
| 2010/0251128 A1 | 9/2010 | Cordasco |
| 2010/0268694 A1 | 10/2010 | Denoue |
| 2010/0287229 A1 | 11/2010 | Hauser |
| 2010/0318507 A1 | 12/2010 | Grant et al. |
| 2011/0029665 A1* | 2/2011 | Wenig .................. H04L 67/22 709/224 |
| 2011/0085526 A1 | 4/2011 | Joseph |
| 2011/0173239 A1* | 7/2011 | Sayed .................. G06F 9/542 707/821 |
| 2011/0320880 A1 | 12/2011 | Wenig |
| 2012/0002903 A1 | 1/2012 | Wilensky |
| 2012/0038546 A1 | 2/2012 | Cromer |
| 2012/0038678 A1 | 2/2012 | Hwang |
| 2012/0084437 A1 | 4/2012 | Wenig |
| 2012/0089950 A1 | 4/2012 | Tseng |
| 2012/0102101 A1 | 4/2012 | Wenig |
| 2012/0151329 A1 | 6/2012 | Cordasco |
| 2012/0151384 A1 | 6/2012 | Stass |
| 2012/0157122 A1 | 6/2012 | Niranjan |
| 2012/0173966 A1* | 7/2012 | Powell ............... G06Q 30/0241 715/234 |
| 2012/0242604 A1 | 9/2012 | Kato |
| 2013/0069947 A1 | 3/2013 | Berstler |
| 2013/0091417 A1 | 4/2013 | Cordasco |
| 2013/0097484 A1 | 4/2013 | Nakamura |
| 2013/0104065 A1 | 4/2013 | Stecher |
| 2013/0132833 A1* | 5/2013 | White .................. G06F 3/048 715/704 |
| 2013/0136253 A1* | 5/2013 | Liberman Ben-Ami ............ H04M 3/5191 379/265.09 |
| 2013/0339428 A1 | 12/2013 | Wenig |
| 2014/0063174 A1 | 3/2014 | Junuzovic |
| 2014/0108911 A1 | 4/2014 | Damale |
| 2014/0109018 A1 | 4/2014 | Casey |
| 2014/0115506 A1 | 4/2014 | George |
| 2014/0115712 A1* | 4/2014 | Powell ............... G06F 21/6263 726/26 |
| 2014/0137052 A1 | 5/2014 | Hernandez |
| 2014/0143652 A1 | 5/2014 | DeLoach |
| 2014/0250110 A1 | 9/2014 | Yang |
| 2016/0006840 A1 | 1/2016 | Wenig |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 98/26571 | 6/1998 |
| WO | 9825372 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |
| WO | 2010/141748 | 12/2010 |

OTHER PUBLICATIONS

Bishop, Mall et al., "A Model of Security Monitoring", Department of Mathematics and Computer Science, Dartmouth College, pp. 46-52. Dec. 1989.

Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999 (Oct. 21, 1999), pp. 337-355.

International Search Report for PCT/US08/65582; dated Sep. 11, 2008.

International Search Report for PCT/US2007/071096; dated May 13, 2008.

Written Opinion of the International Searching Authority for PCT/US08/65582; dated Sep. 11, 2008.

Written Opinion of the International Searching Authority for PCT/US07/71096; dated May 13, 2008.

PCT Search Report for PCT/US2011/033813; dated Jul. 28, 2011.

Written Opinion of the International Searching Authority for PCT/US2011/033813; dated Jul. 28, 2011.

International Search Report for PCT/US09/04654; dated Oct. 2, 2009.

Written Opinion of the International Searching Authority; PCT/US09/04654; dated Oct. 2, 2009.

Holloway, et al., "Cryptographic Initialization Test", IBM Technical Disclosure Bulletin, pp. 195-198, Feb. 1991.

International Search Report for PCT/US11/35410; dated Dec. 14, 2011.

Written Opinion of the International Searching Authority; PCT/US11/35410; dated Dec. 14, 2011.

Han et al., "Using Ajax for Desktop—;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.

Lubarsky, How to Delete Cookie Using Javascript, Aug. 19, 2007, http:web.archive.org/web/20070819123​55/https://blogs.x2line.corm.al/articles/316.aspx.

International Search Report for PCT/US12/25971; dated May 31, 2012.

Written Opinion of the International Searching Authority for PCT/US12/25971; dated May 31, 2012.

Deter Brusilovsky et. al., "Adaptive and Intelligent Web-based Educational Systems," International Journal of Artificial Intelligence in Education, Apr. 1, 2003 (Apr. 1, 2003), pp. 159-172, XP55039152, The Netherlands Retrieved from the Internet: URL: http://www.sis.pitt.edu~peterb/papers/AIWBES.pdf [retrieved on Sep. 25, 2012] pp. 160-161.

Atterer R et al.: "Knowing the User's Every Move—User Activity Tracking for Website Usability Evaluation and Implicit Interaction," WWW '06 Proceedings of the 15th World Wide Web, ACM, New York, NY, USA, May 22, 2006. (May 22, 2006), pp. 203-212, XP002519605, DOI: 10.1145/1135777.1135811 ISBN 978-1-5959-323-2.

(56) References Cited

OTHER PUBLICATIONS

Reed Martin; Using Google Analytics Site Overlay; Community Spark; Apr. 13, 2007. Online: <http://www.communityspark.com/using-google-analytics-site-overlay/>.

Stolowitz Ford Cowger LLP; Listing of Related Cases; Mar. 14, 2012.

Rubio, An Introduction to JSON, Feb. 28, 2007, http://www.oracle.com/technetwork/articles/entarch/introduction-json-097942.html.

Teare, An Introduction to Ajax, Aug. 2005, http://www.oracle.com/technetwork/articles/entarch/ajax-introduction-096831.html.

Stolowitz Ford Cowger LLP; Listing of Related Cases; Dec. 19, 2013.

Summons to attend oral proceedings pursuant to Rule 115(1) in EP App. No. 07840244.3; Dated Dec. 12, 2013.

Stolowitz Ford Cowger LLP Listing of Related Cases May 14, 2013.

Communication from the EP Patent Office pursuant to Article 94(3) EPC in EP Application No. 09806979.2; dated Jan. 6, 2014.

International Search Report for PCT/US2013/023636; dated Aug. 13, 2011.

Written Opinion of the International Searching Authority for PCT/US2013/023636; dated Aug. 13, 2013.

Nino, et al., CARENA: A Tool to Capture and Replay Web Navigation Sessions; 2005, IEEE; pp. 127-141.

Mel; Distribute Paths to Separate Layers—Illustrator Tutorial; pp. 1-3; Aug. 23, 2009.

\* cited by examiner

CAPTURING AND REPLAYING APPLICATION SESSIONS USING RESOURCE FILES

The present application is a continuation of patent application Ser. No. 13/834,963, filed Mar. 15, 2013, entitled: CAPTURING AND REPLAYING APPLICATION SESSIONS USING RESOURCE FILES, which claims priority to provisional patent application Ser. No. 61/714,020, filed Oct. 15, 2012, entitled: METHOD AND APPARATUS FOR CAPTURING AND REPLAYING APPLICATION SESSIONS. The above-identified applications are incorporated herein by reference in their entireties.

BACKGROUND

Intelligent networked devices, such as smart phones, tablet computers, personal computers, etc. present new challenges when trying to understand user behavior and experiences during application sessions. The intelligent devices may use new classes of mobile applications that leverage distributed code, local databases, and intermittent network communications.

A monitoring system may monitor and analyze an application session performed on the device. An agent operating in the device may continuously capture images displayed on a screen of the device and may capture user inputs entered into the device during the application sessions. The agent may send the captured screen images and user inputs to a server. The server may replay the captured application session by displaying the captured images along-side the captured user inputs.

In order to correctly evaluate a user experience during the application session, a replay system may try to recreate the images displayed on the device during the original application session and recreate the user inputs entered into the device during the original application session.

Some devices may have limited processing and transmission bandwidth. Thus, a monitoring system operating on the device may have problems capturing the large amounts of image data displayed during application sessions. For example, the monitoring systems may slow down the device and disrupt the application session.

BRIEF SUMMARY

A capture and replay system identifies images displayed during an application session. A parser may generate Hypertext Markup Language (HTML) code from an application resource file or from the JSON post made by the application. A replay engine may use the HTML code to recreate at least some of the screens displayed during the application session. The capture and replay system may dynamically identify images that are not reproduced from the resources database and request an agent/(s) to asynchronously upload the image files associated with the images. The replay engine may use the uploaded image files to replay the application session. The capture and replay system may capture application sessions more efficiently by reproducing images from the resource file instead of capturing the images during the original application session and by dynamically requesting image files for the images were are not previously reproduced from the resource file. Once an image file is uploaded to server, it does not need to be requested again from any other agent.

DETAILED DESCRIPTION

Figure 1:
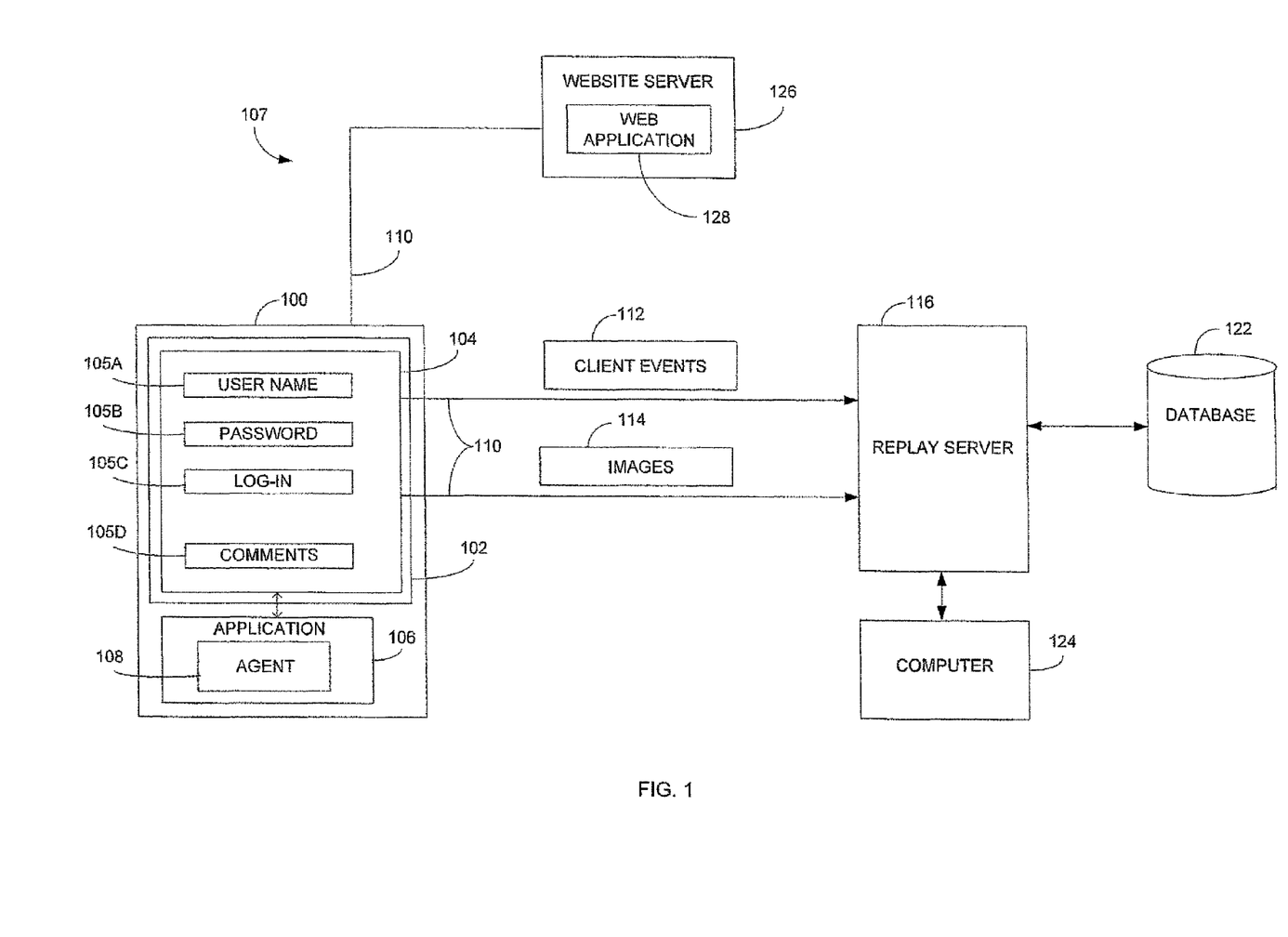
FIG. 1 depicts an example of a system for capturing and replaying application sessions.

FIG. 1 depicts an example of a client device 100 operating an application 106. Client device 100 may comprise a smart phone, a Personal Digital Assistant (PDA), a terminal, a personal computer, a laptop computer, a tablet computer, a notebook computer, or any other type of computing device that operates application 106.

A network 110 may operably couple client device 100 to a website server 126 and to a replay server 116. Network 110 may be any combination of Internet networks, Local Area Networks (LANs), Wide Area Networks (WANs), Public Service Telephone Networks (PSTNs), cellular networks, or the like, or any combination thereof.

Application 106 may be any combination of software and/or hardware that conducts any type of application session 107. For simplicity, only one application 106 is shown in FIG. 1. However, it should be understood that client device 100 may execute any variety of different applications 106.

Application 106 may perform different functions on client device 100. For example, a user may use application 106 to purchase items or services, play video games, provide digital navigation, search the internet, etc. These of course are just examples of any variety of functions performed by application 106.

In one example, application 106 may comprise a server based application that operates within a web browser environment and communicates with a web application 128 operating on website server 126. In another example, application 106 may comprise a native application that at times operates independently of web application 128 and at other times exchanges information with web application 128.

Application 106 is shown displaying an image 104 within a screen 102 on client device 100. In this example, image 104 may comprise an electronic page including a field 105A for entering a user name, a field 105B for entering a password, an icon 105C for initiating a login operation, and a field 105D for entering comments. A user may enter information into fields 105A, 105B, and 105D and select icon 105C to initiate a login process with application 106.

After logging in, the user may use application 106 to conduct an application session 107 with web application 128. For example, application 106 may send inventory requests or purchase requests for particular items to web application 128. Web application 128 may send webpages back to client device 100 showing available products and/or confirming the completion of an online transaction.

An agent 108 may be embedded in application 106 and capture client events 112 during application session 107. Agent 108 may send the captured client events 112 to replay server 116. Client events 112 may contain data and states created or entered locally on client device 100. For example, client events 112 may identify text entered into fields 105A, 105B, and 105D, and identify a user input selecting icon 105C. In another example, client events 112 also may include images 114, such as, binary screen shots displayed on screen 102 during application session 107.

Replay server 116 may store captured client events 112 and images 114 in a database 122 and display the captured images 114 on a computer 124 in a sequence similar to what was previously displayed during original application session 107. Other client events 112, such as the user inputs, may be displayed on computer 124 along-side images 114.

The binary screen shots contained in images 114 may comprise a substantial amount of data. Agent 108 may use a substantial amount of processing bandwidth in client device 100 to capture images 114. The additional bandwidth requirements may slow down client device 100 and/or application 106. For example, application 106 may take longer to load webpages and disrupt normal user experiences during application session 107.

Images 114 may comprise bitmap images of webpages. Client events 112 may contain user inputs that enter data into fields of the webpages. However, replay server 116 may not be able to insert the user inputs in the bitmap images. Thus, replay server 116 may not be able to accurately reproduce some states for application session 107.

Figure 2:
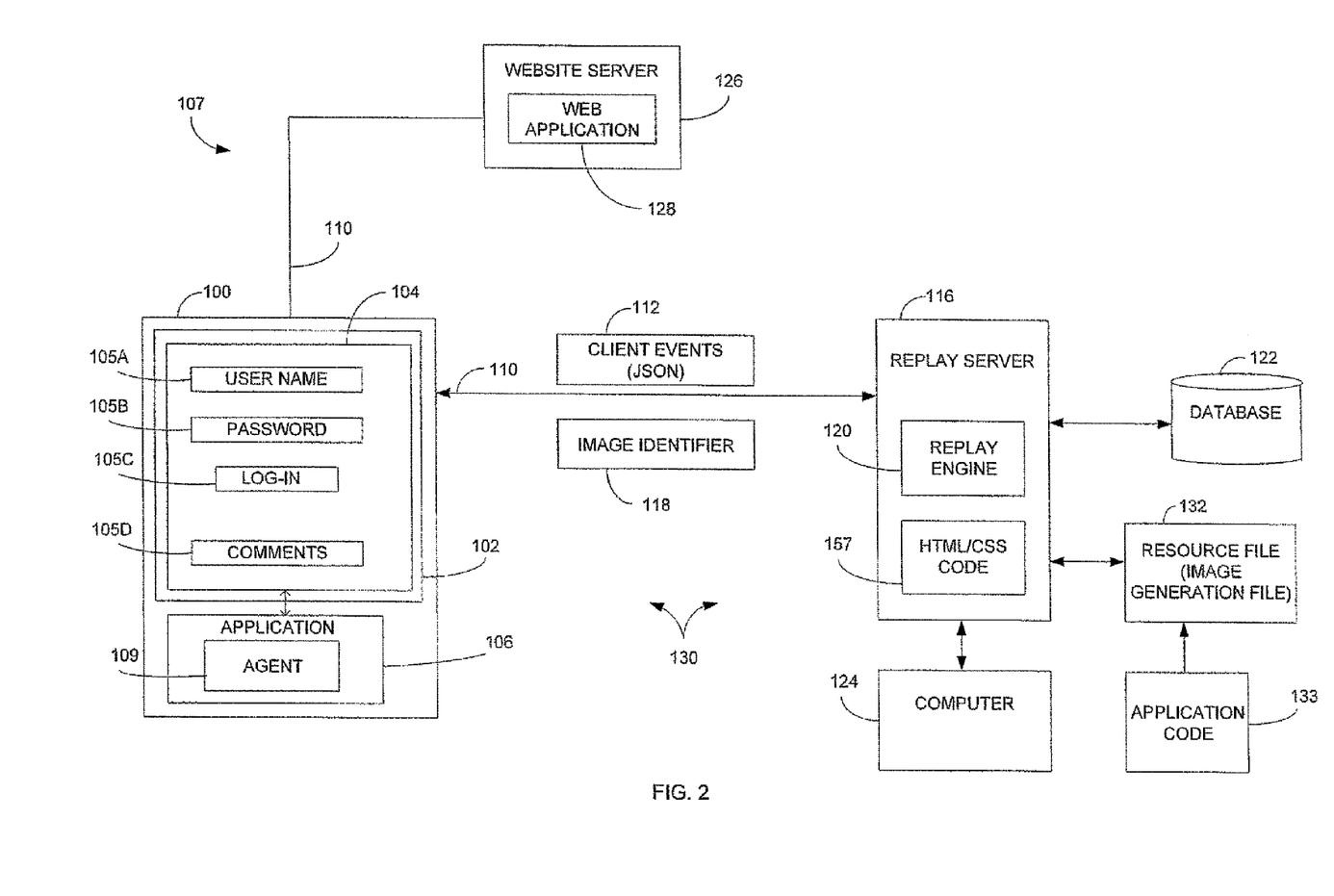
FIG. 2 depicts an example of a capture and replay system that uses resource files to recreate images from application sessions.

FIG. 2 depicts a capture and replay system 130 that may more efficiently and/or more accurately capture and replay application sessions, such as application session 107. Instead of capturing binary screen shots from screen 102, capture and replay system 130 may recreate images from a resource file 132 associated with application 106.

Application 106 may comprise executable software that runs on client device 100 and conducts application session 107. Application code 133 may comprise uncompiled software code for implementing application 106. For example, application code 133 may comprise Objective C or Java code.

Resource file 132 may alternatively be referred to as an image generation file and may comprise software code used by application code 133 for generating application 106. For example, resource file 132 may comprise a collection of Extensible Markup Language (XML) code used by application 106 to display icons, menus, dialog boxes, string, tables, text box locators, button locators, user-defined binary data, or any other type of data.

A compiler (not shown) may compile application code 133 with resource file 132 to create application 106. Once compiled, application code 133 and resource file 132 may be embedded directly into a single executable file (EXE) for application 106 containing both code and image resources.

Agent 109 may send captured client events 112 in a JSON format to replay server 116. Client events 112 may identify any navigation, history, sequence, and/or state of application session 107. Client events 112 also may include image data, such as a height, a width, and a location of webpage elements. Client events 112 also may contain text, names, field identifiers, location identifiers, image data, Document Object Models (DOMs), mouse clicks, keyboard entries, metadata, or any other data that may be associated with a user input or application state for application session 107.

Agent 109 or replay server 116 also may add timestamps to client events 112 that identify the sequence of electronic pages displayed during the application session 107, the sequence of user inputs entered into the electronic pages, how long the electronic pages and images are displayed during the application session, and how long a user takes to enter inputs into fields of the electronic pages.

Agent 109 may comprise a software library compiled with application code 133. In one example, the software libraries may use JavaScript, Java, and/or Objective C to implement agent 109. However, the software libraries may use any code format.

Replay server 116 may generate Hyper-Text Markup Language (HTML) and Cascading Style Sheet (CSS) code 157 from resource file 132. Replay server 116 then may merge client events 112 with the HTML and CSS 157 generated from resource file 132 to recreate and replay the images and states for application session 107.

Some electronic images, or portions of electronic images, may not exist or may not be defined in resource file 132. For example, some control fields may be dynamically created at application session runtime. Agent 109 may capture image information missing from resource file 132 and include the captured image information as part of client events 112.

For example, application 106 may notify agent 109 when a new control field is created and displayed during application session 107. Agent 109 may generate client events 112 that identify the state change associated with the control field, contain a tag identifying the control field, contain a timestamp identifying when the control field was identified, and contain any user inputs entered or applied to the control field. Replay engine 120 then may apply the control field attributes to the webpage generated from the resource file 132.

In another example, agent 109 may dynamically upload image files to replay server 116. For example, agent 109 may detect a new image displayed on client device 100. Agent 109 may send an image file identifier 118 to replay server 116 that uniquely identifies the image file associated with the displayed image. Replay server 116 may search through database 122 for an image file matching image identifier 118. If no associated image file is located in database 122, replay server 116 may request agent 109 to upload the image file. Agent 109 may dynamically send the identified image file to replay server 116 in response to the request. Replay server 166 then may store and use the uploaded image file for replaying application session 107.

A same image may be displayed during a second application session 107. Agent 109 may generate and send a same image identifier 118 associated with the image to replay server 116. Replay server 116 again may check database 122 for an associated image file. The image file was previously sent by agent 109 to replay server 116 during the first application session 107. Thus, replay server 116 will not send a request back to agent 109 to upload the image file.

Replay server 116 reduces the image capture and processing requirements of processing agent 109 by using resource file 132 recreate some of the images from application session 107. The reduced processing requirements may prevent agent 109 from slowing down client device 100 and/or application session 107. Images that cannot be recreated from the resource file may be dynamically requested from the agent 109. Once uploaded to replay server 116, agents 109 no longer need to resend the same image file to replay server 116.

As discussed above, some replay systems may display user inputs adjacent to screen bitmap images. Replay server 116 may apply captured client events 112 to the HTML and CSS created from resource file 132 and possibly recreate states that were previously not reproducible using captured bitmap images.

Figure 3:
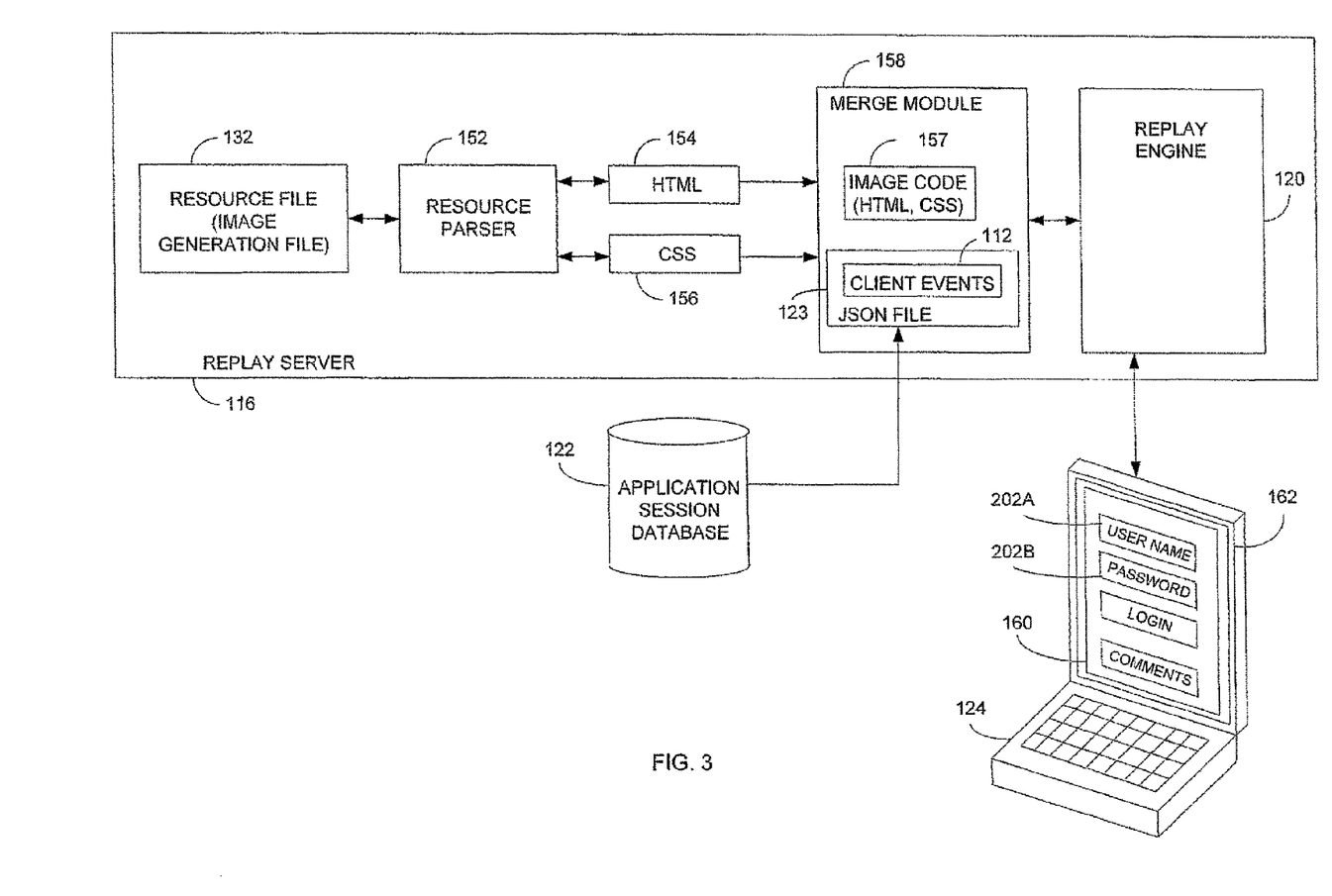
FIG. 3 depicts an example replay server used by the capture and replay system.

FIG. 3 depicts in more detail operations performed by replay server 116. Replay server 116 may obtain resource file 132 from the entity, such as a business, associated with application 106 in FIG. 2. A resource parser 152 may generate image code from resource file 132. In one example, image code may include a common HTML format 154 and/or Cascading Style Sheets (CSS) 156 understood by a browser. For explanation purposes, image code is alternatively referred to generally as HTML 157 and/or HTML file 157. However, it should be understood that image code 157 may comprise any code, image data, or any other information extracted and/or generated from resource file 132.

In one example, a first resource parser 152 may generate HTML and CSS from resource files 132 for applications operating in an Android® operating system and a second resource parser 152 may generate HTML and CSS from resource files 132 for applications operating in an Apple® operating system. However, resource parser 152 may generate image code for any operating system.

A merge module 158 may merge client events 112 in JSON file 123 with HTML 157. Replay engine 120 may replay merged HTML 157 and client events 112 to recreate the application session. For example, merge module 158 may generate JavaScript that applies user inputs contained in client events 112 to the HTML 154 and CSS 156 generated from resource file 132.

HTML 157 extracted from resource file 132 may provide boot-up and starting states for the replayed application session. For example, HTML 157 may render a webpage initially displayed during application session 107. Client events 112 then may identify modifications, inputs, and other run-time information associated with the rendered webpage.

For example, one of client events 112 may contain an identifier associated with a webpage 160. Replay engine 120 may use HTML 157 associated with the identifier to render webpage 160. Replay engine 120 then may apply user inputs contained in client events 112 to webpage 160. For example, replay engine 120 may enter text identified in client events 112 into fields 202A and 202B of webpage 160.

Figure 4:
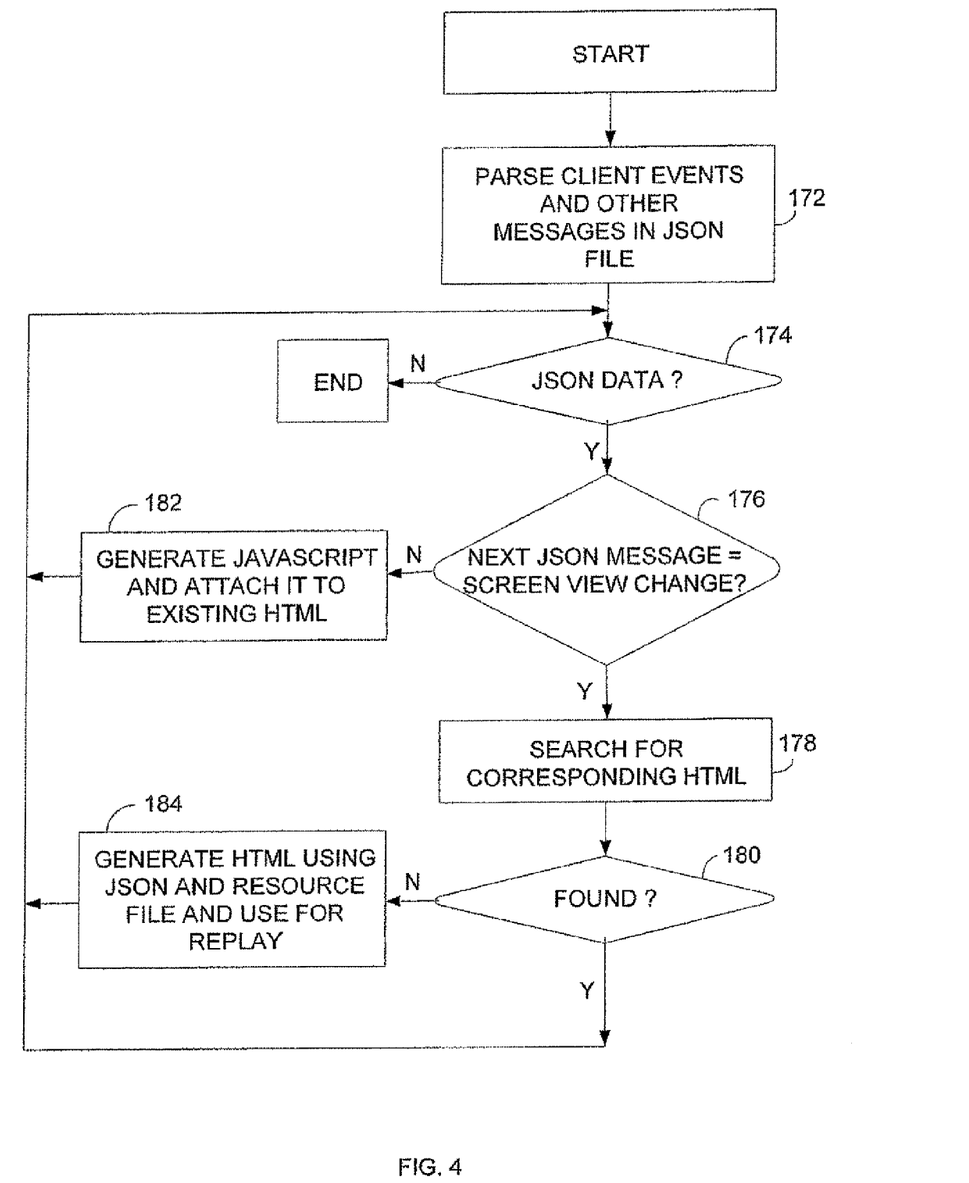
FIG. 4 depicts an example process for recreating an application session using a resource file.

FIG. 4 depicts one example process for using a resource file and client events to generate software code for replaying an application session. Operation 172 may parse through client events or any other messages captured during the application session. Operation 174 may identify a next client event in the JSON file.

The replay server in operation 176 may determine if the client event is associated with a screen view change. A screen view change may represent a change in the image displayed on the client device during the application session. For example, the replay server may associate a screen view change with a client event containing a new webpage identifier. The new webpage identifier may identify a new webpage and therefore indicate a change in the image currently displayed on the screen of the client device during the application session.

When no screen view change is identified in operation 176, the replay server in operation 182 may generate and attach code to existing HTML. For example, the identified client event may comprise a user input that enters data into a field of a currently displayed webpage. Operation 182 may generate code, such as JavaScript, that enters or displays the data from the user input into a field of the currently displayed webpage. In one example, the application session may be replayed on client device 100 in FIG. 2 instead of computer 124 in FIG. 3. In this example, the replay server may generate code in a native language of application 106 in FIG. 2.

Table 1.0 shows example client events contained in a JSON file that may identify a button icon with text "Log-In" and an identifier (id) of "103". The client events also may indicate the button is clicked.

TABLE 1.0

```
{
    "type": 4,
    "screenviewOffset": 18505,
    "fromWeb": "false",
    "target": {
        "tlType": "button",
        "type": "UIRoundedRectButton",
        "id": "103",
        "visitedCount": 1,
        "position": {
            "y": 176,
            "width": 100,
            "x": 110,
            "height": 37
        },
        "currState": {
            "text": "Log-In"
        },
        "prevState": {
            "text": "Log-In"
        }
    },
    "offset": 19413,
    "event": {
        "tlEvent": "click",
        "type": "pressedButtonLogin"
    }
},
```

The replay server may generate the following JavaScript based on the above JSON file.

```
var elem = document.getElementById("103");
if( elem !--- null )
{
    elem.click( );
}
```

The replay server in operation 176 may identify a client event in the JSON file associated with a screen view change. For example, the client event in the JSON file may indicate selection of a Hypertext Transfer Protocol (HTTP) link that displays a new webpage on the client device.

Operation 178 may search through the HTML and CSS generated from the resource file for the associated screen view change. For example, the client event may contain a new webpage identifier and operation 178 may search for HTML associated with the webpage identifier. During replay, the replay server may use the HTML identified in operation 180 to render the new webpage.

The replay server in operation 180 may not find HTML associated with the screen view change. For example, the application may generate the screen change at runtime during the original application session. The replay server may not be able to reproduce the screen view change solely from the resource file HTML.

Operation 184 may generate HTML for the screen view change using a combination of client events in the JSON file and other data from the resource file. For example, the client events may identify a change in the color of a field displayed within a webpage. Operation 184 may generate HTML that changes the color of the field based on image information contained in the client events in the JSON file. For example, the client event may identify a location and a color for the field.

As described above in table 1.0, example client events in the JSON file may identify a button icon having associated text "Log-In" and an associated identifier (id) "103." The client events from the JSON file also may indicate the button icon is clicked and identify the position of the button icon as x=110 and y=176 with a width and height of 100 and 37, respectively.

The replay server in operation 184 may generate the example HTML in Table 2.0 based on the client events in the JSON file shown in Table 1.0. The HTML in table 2.0 may render an image showing the selection of the button icon.

TABLE 2.0

```
<!DOCTYPE html>
<html>
<head>
<style type="text/css">
    .id100 {
        position: absolute;
        top: 176px;
        left: 110px;
        width: 100px;
        height: 37px;
    }
</style>
<script>
var elem = document.getElementById("103");
if( elem != null)
{
    elem.click( );
}
</script>
</head>
<body>
<input type="button" id="103" class="id100" value="Log-In"></input>
</body>
</html>
```

The replay server in operation 174 may parse through the remainder of the client events in the JSON file. The replay server may use the HTML from the resource file and the client events from the JSON file to generate JavaScript and HTML for recreating and replaying the different states of the original application session.

Figure 5A:
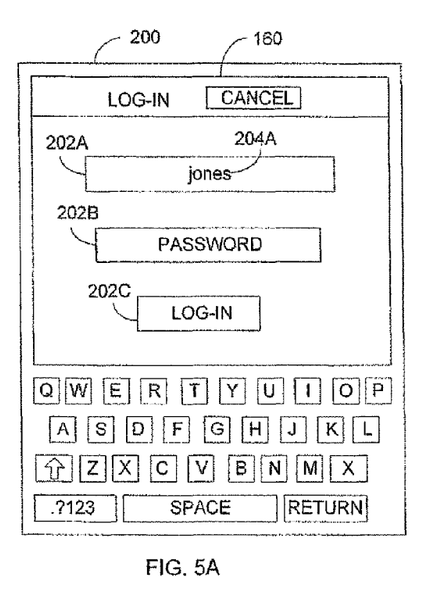
FIGS. 5A-5C depicts an example of a replayed application session.
Figure 5B:
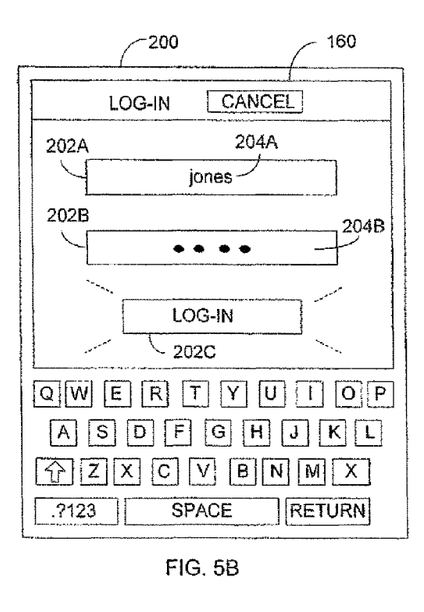
Figure 5C:
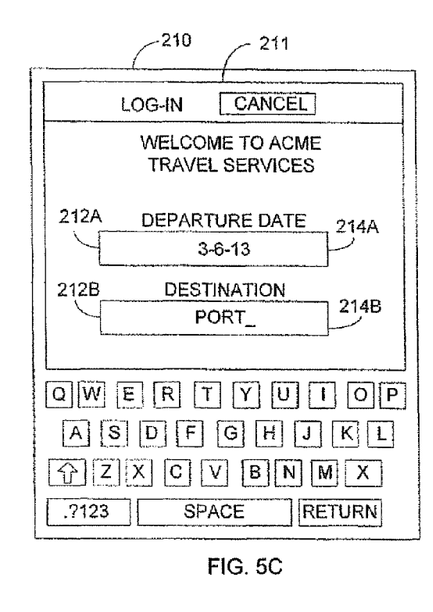

FIGS. 5A-5C depicts one example of how the replay engine may replay an application session. In FIG. 5A, the replay engine may display an image 200. In one example, image 200 may display webpage 160 previously loaded on the client device during the application session. Image 200 may be rendered from the HTML that was created from the resource file. Image 200 also may include fields 202A-202C.

The replay engine may identify a client event associated with webpage 160. For example, the client event may enter a name 204A into field 202A. The replay engine may generate code that applies the client event to webpage 160. For example, the replay engine may render image 200 with name 204A entered into field 202A.

FIG. 5B shows another replay state. The replay engine may replay an additional client event that enters a password 204B into field 202B. In one example, an additional state occurred during the original application session. For example, logic in webpage 160 may have changed the color of log-in field 202C in response to entry of name 204A and password 204B. The color change may visually prompt the user to select field 202C for completing a log-in process. The color change for log-in field 202C may have happened at runtime during the original application session and may not be contained in the HTML generated from the resource file.

The agent 109 of FIG. 2 may have created a client event during the original application session that identifies the color change for log-in field 202C. The agent also may have included a timestamp in the client event indicating the color change happened after name 204A was entered into field 202A and password 204B was entered into field 202B. The replay server may generate replay code based on the client event that changes the color of field 202C in webpage 160. During replay, the replay engine may use the code to display image 200 with the color change for field 202C.

FIG. 5C shows another image 210 displayed during replay. In this example, image 210 may comprise a webpage 211 displayed during the previously captured application session. The replay engine may use HTML generated from the resource file to render image 210. Additional client events may be associated with webpage 211. For example, webpage 211 may contain fields 212A and 212B. Client events associated with webpage 211 may contain user inputs that enter text 214A and 214B into fields 212A and 212B, respectively. The replay server may generate code based on the client events that enter text 214A and 214B into fields 212A and 212B, respectively. The replay engine then may use the code during replay to display image 210.

Figure 6:
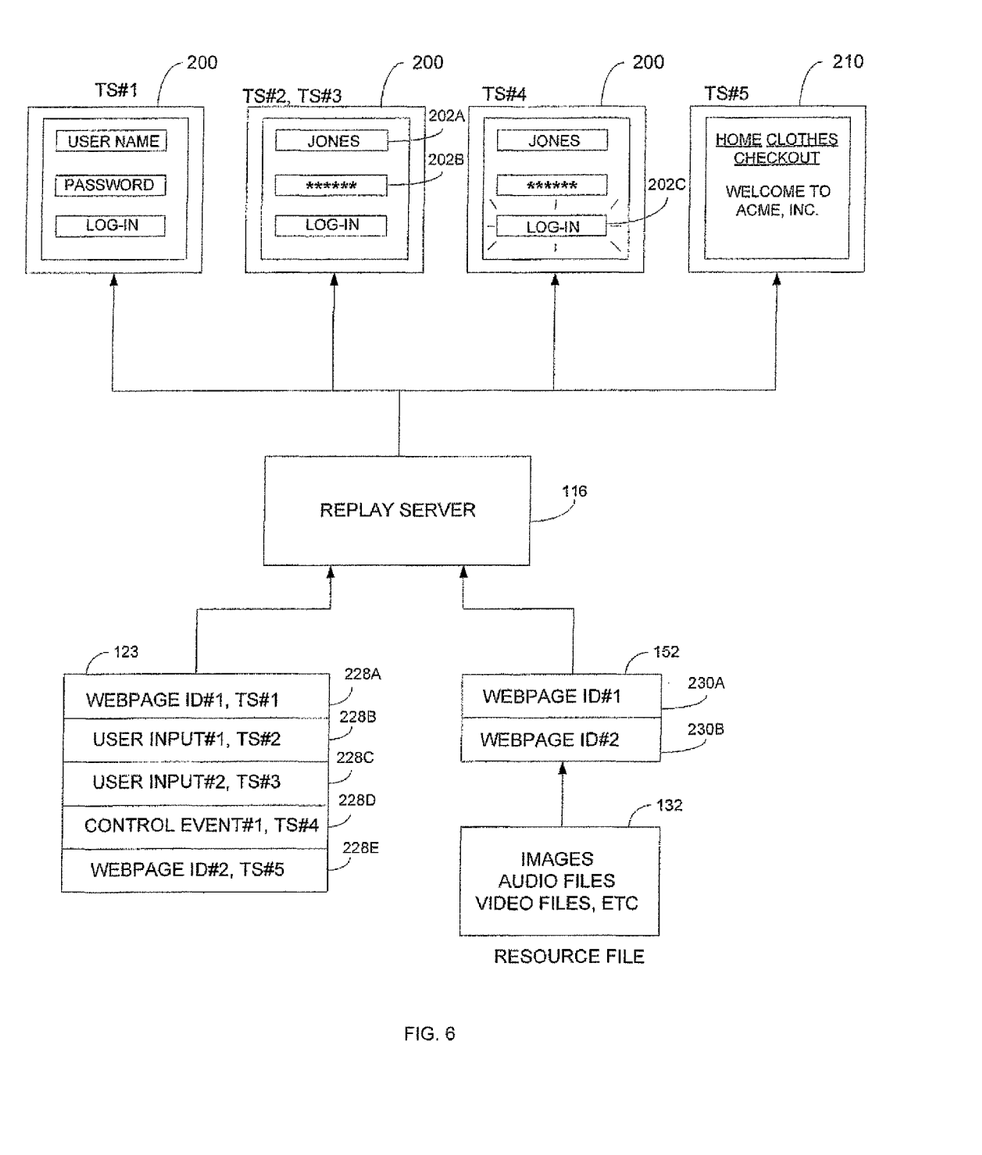
FIG. 6 depicts an example how client events are used for replaying the application session.

FIG. 6 depicts in more detail one example of how replay server 116 may replay the application session shown in FIGS. 5A-5C. The agent may have captured client events 228A-228E during the application session and formatted the client events into JSON file 123. An example list of client events 228A-228E may include a first webpage identifier ID#1, a first user input#1, a second user input#2, a control event#1, and a second webpage identifier ID#2, respectively.

Client events 228 may be assigned associated timestamps (TS). For example, client event 228A may be assigned a timestamp value TS#1, client event 228B may be assigned a timestamp value TS#2, client event 228C may be assigned a timestamp value TS#3, etc. The timestamp values may identify the order that client events 228 were detected and/or captured during the application session. For example, client event 228B may have been detected or captured after client event 228A. The timestamp values may identify a time of day, count value, or any other value that identifies a sequence for client events 228 and replay server 116 may replay client events 228 in the sequence associated with the timestamp values.

As explained above, replay server 116 may have previously converted image data in resource file 132 into HTML and/or CSS code 230 in HTML file 152. Replay server 116 may merge client events 228 in JSON file 123 with HTML 230 in HTML file 152. For example, replay server 116 may identify a new webpage ID#1 in client event 228A. Replay server 116 may determine HTML or CSS 230A is associated with webpage ID#1. Replay server 116 then may render image 200 based on HTML 230A associated with webpage ID#1.

User input #1 contained in client event 228B and user input #2 contained in client event 228C may identify text 202A and 202b entered into fields of webpage ID#1. Replay server 116 may generate JavaScript that renders webpage ID#1 with the fields populated with text 202A and 202b.

Client event 228D may contain a control event #1. Replay server 116 may identify control event#1 as an image change event that does not have corresponding HTML or CSS in HTML file 152. For example, control software in webpageID#1 may have changed the color of field 202C in response to user input#1 and/or user input#2. Replay server 116 may generate HTML based on client event 228D that displays the color change in field 202C.

The next client event 228E may contain webpage identifier ID#2. Replay server 116 may search HTML file 152 for HTML or CSS associated with webpage ID#2. In this example, replay server may identify HTML 230B as associated with webpage ID#2. Replay server 116 then may use HTML 230B to render a next image 210 displaying webpage ID#2.

Figure 7:
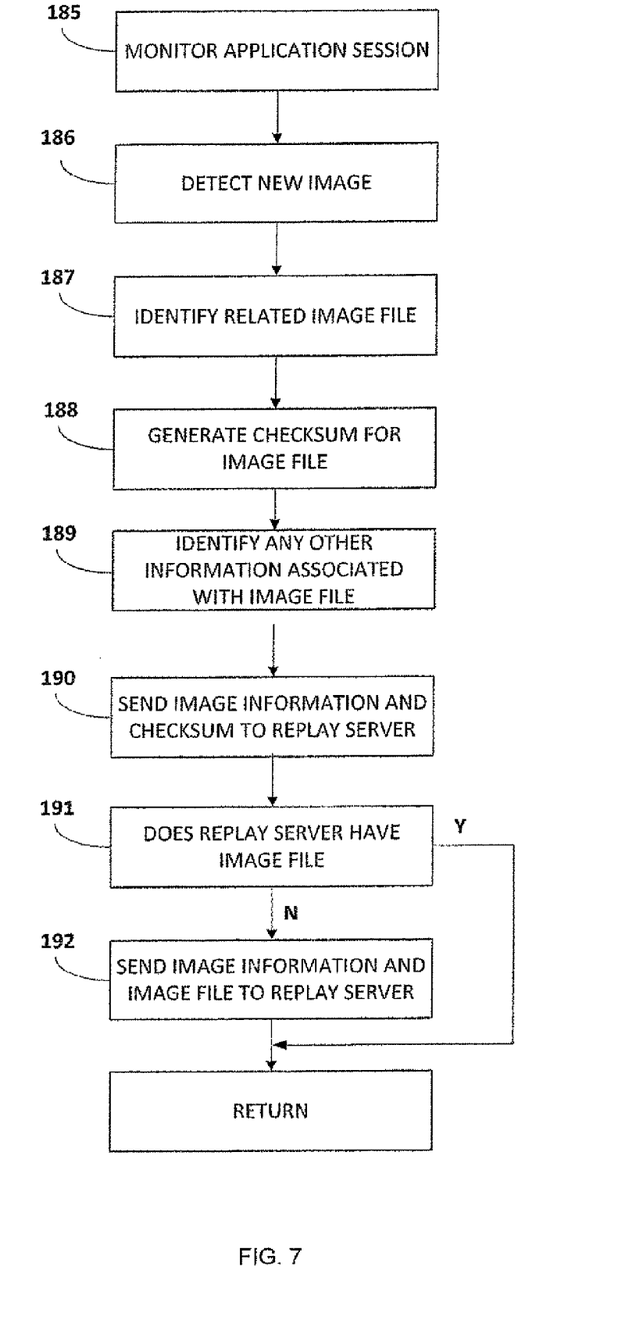
FIG. 7 depicts an example of how a client device may dynamically capture and transmit image files.

FIG. 7 depicts an example process for dynamically sending image files to the replay server. In operation 185, the agent may monitor the application session. In operation 186, the agent may detect a new image displayed during the application session. In operation 187, the agent may identify an image file associated with the displayed image. For example, the agent may search the application operating on client device 100 for the associated image file.

In operation 188, the agent may generate a checksum for the identified image file. For example, the agent may use a Message-Digest algorithm 5 (MD5) or a Secure Hash Algorithm (SHA2) to generate a checksum value from the image file. In operation 189, the agent may identify other information associated with the displayed image. For example, the agent may identify a screen view offset value, image type, image identifier, and/or position information associated with the displayed image.

In operation 190, the agent may send the checksum and any other associated image information to the replay server. When the image file is not currently in the replay server database, the agent may receive a message back from the replay server requesting the image file. If the agent receives a message in operation 191 requesting the image file, the agent in operation 192 may send the image file and any other related image information to the replay server. Operation 192 may send the image file asynchronous from web session 107.

Figure 8:
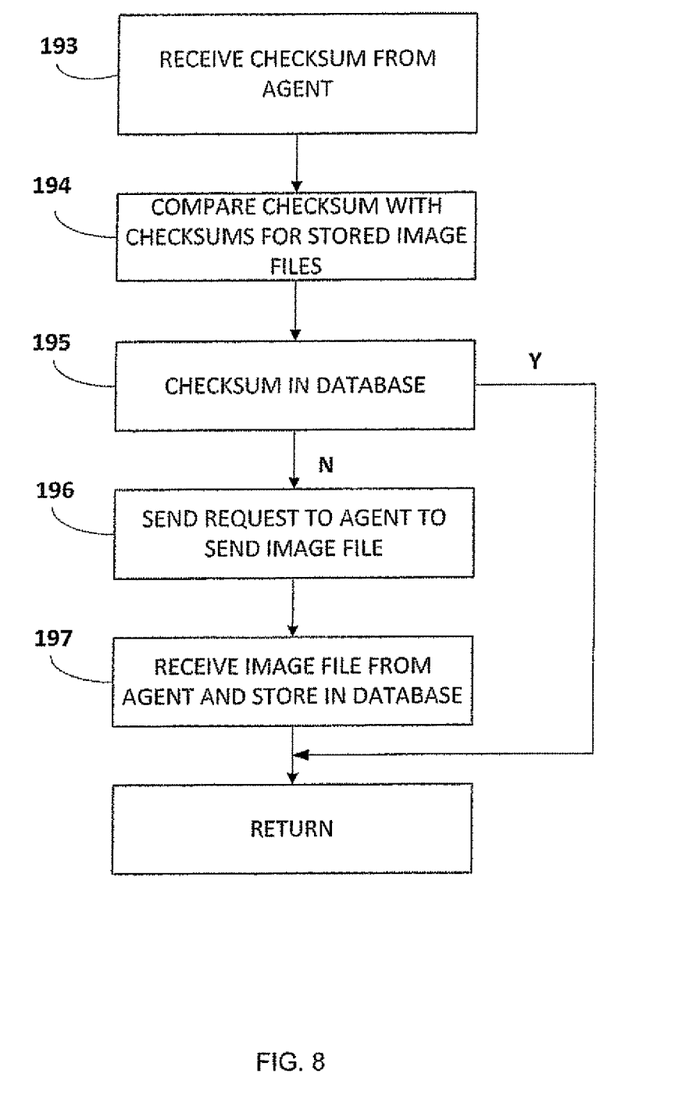
FIG. 8 depicts an example of how a replay server may dynamically request and receive image files from a client device.

FIG. 8 depicts an example process for dynamically requesting image files from an agent. In operation 193, the replay server may receive a checksum value from an agent. Again, the checksum value is generated from and uniquely identifies an associated image file. In operation 194, the replay server may compare the received checksum value with checksum values associated with previously stored image files.

In operation 195, the replay server may identify an image file in the replay server database associated with the received checksum value. When an associated image file is identified, the replay server may not need the agent to send the same image file. Accordingly, the replay server may not request the agent to send the image file.

In operation 195, the replay server may not identify an image file in the replay server database associated with the received checksum value. The replay server in operation 196 may send a message back to the agent requesting the image file. In operation 197, the replay server receives the image file from the agent and stores the image file in the replay server database. Operation 197 may receive the image file from the agent asynchronous from web session 107.

The replay server then may use the image file to reproduce the images previously displayed during the application sessions. For example, the replay server may replay an application session. The client events for the replay session may identify the checksum value. The replay server may search the replay database for the image file associated with the checksum value. The replay server then may render the image using the identified image file.

Figure 9:
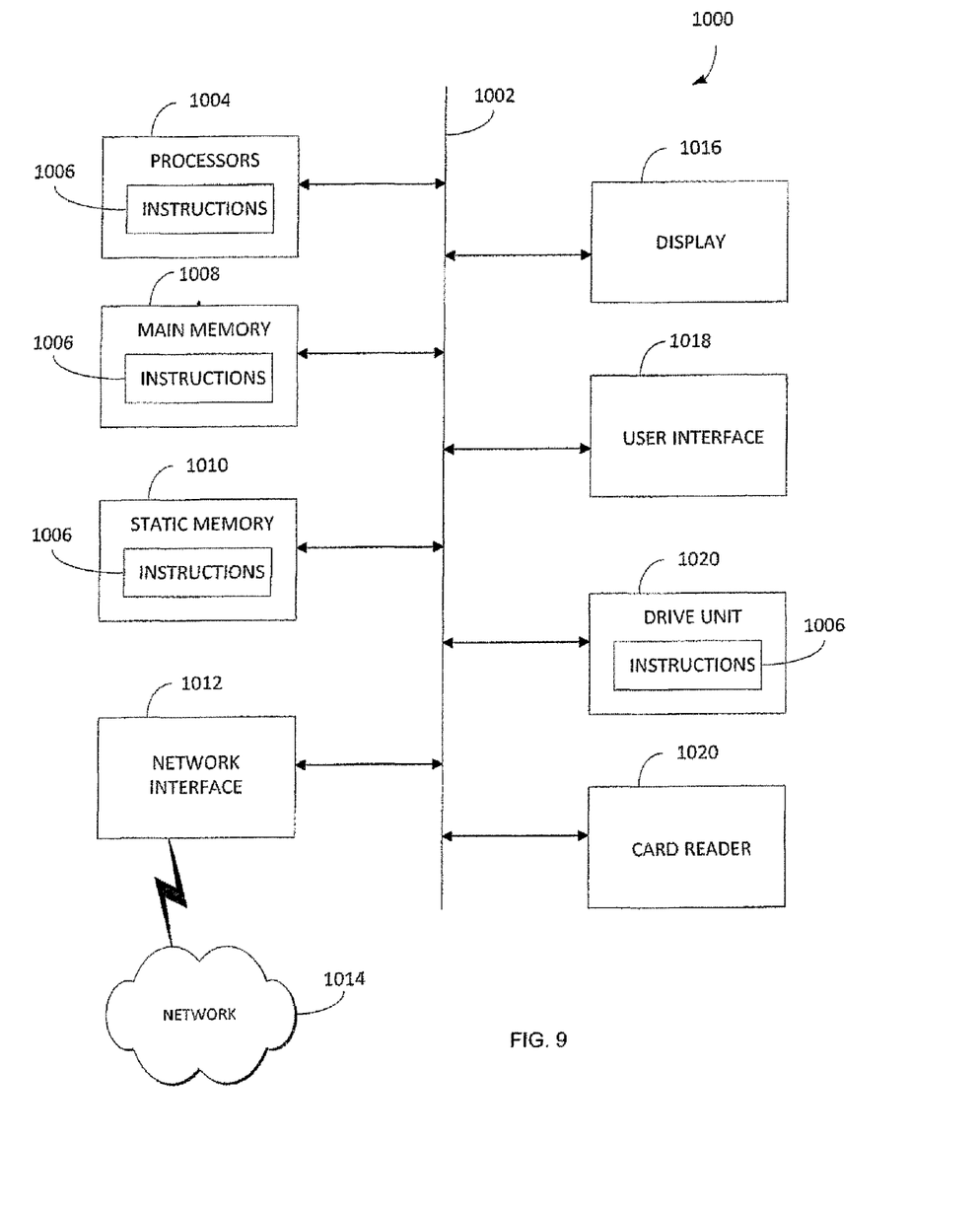
FIG. 9 depicts an example of a computing system used for implementing the capture and replay system.

FIG. 9 shows a computing device 1000 executing instructions 1006 for performing any combination of the operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet PC, a Personal Digital Assistant (PDA), a cellular telephone, a web appliance, or any machine capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory.

Associated memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available non-transitory media that may be locally and/or remotely accessible by a computer or processor, and may include volatile and non-volatile media, and removable and non-removable media. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For the sake of convenience, operations may be described as various interconnected or coupled functional blocks or diagrams. However, there may be cases where these functional blocks or diagrams may be equivalently aggregated into a single logic device, program or operation with unclear boundaries.

Computing device 1000 can further include a video display 1016, such as a liquid crystal display (LCD) or a cathode ray tube (CRT)) and a user interface 1018, such as a keyboard, mouse, or touch screen. All of the components of computing device 1000 may be connected together via a bus 1002 and/or network.

Having described and illustrated the principles of a preferred embodiment, it should be apparent that the embodiments may be modified in arrangement and detail without departing from such principles. Claim is made to all modifications and variation coming within the spirit and scope of the disclosure.

The invention claimed is:

1. A computer program product for replaying an application session, the computer program product comprising a computer readable storage medium having program code embodied therewith, the program code executable by a computer to cause the computer to:
monitor an application session;
capture client events for the application session;
capture image identifiers for images displayed during the application session, wherein the image identifiers are configured to identify image code from an application resource file associated with the images; and
send the client events and image identifiers to a replay system that generates an image generation file including the image code from the application resource file to generate one or more images from the application session.

2. The computer program product of claim 1, wherein the image identifiers are configured to identify Hypertext Markup Language (HTML) code generated from the application resource file.

3. The computer program product of claim 1, wherein:
the image code from the application resource file is configured to render webpages; and
the client events comprise user inputs entered into the webpages during the application session.

4. The computer program product of claim 1, wherein the program code is further configured to cause the computer to:
detect image changes during the application session; and
capture the image changes in the client events.

5. The computer program product of claim 1, wherein the computer comprises at least one of a portable smart phone and/or a portable tablet computer.

6. The computer program product of claim 1, wherein the program code is further configured to cause the computer to:
detect a displayed image during the application session;
identify an image file associated with the displayed image;
generate a file identifier associated with the image file;
send the file identifier to the replay system; and
send the image file associated with the file identifier to the replay system in response to a message indicating the image file is not stored on the replay system.

7. The computer program product of claim 6, wherein the file identifier comprises a checksum of the image file.

8. A method for replaying an application session comprising:
monitoring an application session conducted on a computer;
capturing client events for the application session;
capturing image identifiers for images displayed during the application session, wherein the image identifiers are configured to identify image code from an application resource file associated with the images; and
sending the client events and image identifiers to a replay system that generates an image generation file including the image code from the application resource file to generate one or more images from the application session.

9. The method of claim 8, wherein the image identifiers are configured to identify Hypertext Markup Language (HTML) code generated from the application resource file.

10. The method of claim 8, wherein:
the image code from the application resource file is configured to render webpages; and
the client events comprise user inputs entered into the webpages during the application session.

11. The method of claim 8, further comprising:
detecting image changes during the application session; and
capturing the image changes in the client events.

12. The method of claim 8, wherein the computer comprises at least one of a portable smart phone and/or a portable tablet computer.

13. The method of claim 8, further comprising:
detecting a displayed image during the application session;
identifying an image file associated with the displayed image;
generating a file identifier associated with the image file;
sending the file identifier to the replay system; and
sending the image file associated with the file identifier to the replay system in response to a message indicating the image file is not stored on the replay system.

14. The method of claim 13, wherein the file identifier comprises a checksum of the image file.

* * * * *